United States Patent Office 2,895,960
Patented July 21, 1959

2,895,960

METHOD OF PRODUCTION OF 5-o-METHOXY-PHENOXYMETHYL-2-OXAZOLIDONE

Carl D. Lunsford, Richmond, Va., assignor to A. H. Robins Company, Inc., Richmond, Va., a corporation of Virginia No Drawing. Application June 26, 1958
Serial No. 744,660

7 Claims. (Cl. 260—307)

The present invention concerns itself with a novel process for the production of 5-aryloxymethyl-2-oxazolidones which are extra cyclic ether linked heterocyclic oxazolidone compounds. More particularly the present invention relates to an improved process for the production of 5-o-methoxyphenoxy-2-oxazolidone.

This application is a continuation-in-pare of my copending application Serial No. 680,647, Lunsford, filed August 28, 1957. In that application is disclosed a process of producing 5-o-methoxyphenoxymethyl-2-oxazolidone by the fusion of about 2 mol equivalents of urea with about 1 mol equivalent of the guaiacol ether of glycerol or the guaiacol ether of glycerol chlorhydrin. The fusion of the reactants to form the oxazolidone ring was achieved by heating in the range 170° C.–200° C. for a period of three to five hours and extracting by means of a suitable solvent. Yields of 23% to 37% of the pure 2-oxazolidone were achieved within this temperature range. This reaction in itself was surprising because the normal reaction of urea with primary alcoholic hydroxyl groups leads to the formation of carbamates Organic Synthesis, collective volume one, 140, Davis and Lane (1941), and Kraft, 70, J.A.C.S. 3570 (1948).

It has now been found that by a related process improved yields of purer products may be achieved at considerable commercial savings. The present invention relates to the fusion of about 1 molar equivalent of urea with 1 molar equivalent of 3-o-methoxyphenoxy-2-hydroxy-1-propyl carbamate according to the following equation:

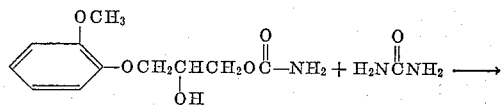

The reactants are commercially available. 3-o-methoxyphenoxy-2-hydroxy-1-propyl carbamate (methocarbamol, Robaxin, A. H. Robins Company, Inc., Richmond, Va.), is the subject of U.S. 2,770,649, Murphey. This compound may be conveniently prepared by reacting 3-o-methoxyphenoxy-1,2-propanediol with phosgene to produce the intermediate chlorocarbonate compound and then reacting said chlorocarbonate with ammonium hydroxide to yield the desired carbamate.

It has further been discovered that the temperature for heating the reactants has a critical lower limit of about 180° C. and preferably in the range 185° C.–200° C. This raising of the lower limit of the temperature range from previous practice has been found to better suppress undesirable by-products and increase yields both for the present reaction and for the prior fusion reaction of about 2 mols of urea and about 1 mol of glyceryl guaiacol ether previously disclosed in my parent application Serial No. 680,647, Lunsford, filed August 28, 1957. In the said parent application, yields of 23%–37% were achieved while utilizing the broader temperature range of 170° C.–200° C. in the related urea process. In the improved process of the present application, utilizing a heating temperature in the upper range of 185° C.–200° C. yields of 40%–58% have been achieved for the pure compound.

It has further been discovered that undesirable byproducts can be reduced by a very rapid heating to the reaction temperature to bring about the temperature of about 180° C. in the order of one minute or thereabouts.

The reactants are heated together in approximately equimolar proportions and it is critical for improved yields that two conditions be observed. Firstly, the reactants are rapidly brought to reaction temperature. In the laboratory this may be achieved by surrounding the reaction vessel with a preheated metal bath such as Wood's metal and in commercial production by equivalent procedures. Secondly, the reactants must be heated to a temperature of about 180° C. and preferably within the range 185° C.– 200° C. The reactants are heated for a period of about three to five hours and preferably for five hours to assure complete fusion to produce the desired crude oxazolidone.

Thereafter the crude oxazolidone may be conveniently purified in either of two general related methods. One preferred method achieving yields in the order of 55%–60% of pure material melting at 141° C.–143° C. comprises extracting the crude product with a solvent such as chloroform or ethyl acetate and fractionally distilling to recover the pure oxazolidone product. A second preferred method achieving yields of 40% and higher comprises recrystallization from an oxygenated solvent, e.g., alcohols such as ethyl alcohol and ketones such as acetone and water.

The compound which is produced by this invention is related in its pharmacological activity to compounds of well-known therapeutic value which might be characterized as substituted propanediols or glyceryl ethers, for example, 3-o-toloxy-1,2-propanediol (mephenesin), 3-o-methoxyphenoxy-1,2-propanediol (glycerol guaiacolate), 3-o-toloxy-2-hydroxypropyl carbamate (Tolseram, U.S. 2,609,386, Lott et al.), 2-methyl-2-propyl-1,3-propanediol dicarbamate (meprobamate, Equanil, U.S. 2,724,720, Berger et al) and 3-o-methoxyphenoxy-2-hydroxypropyl carbamate (Robaxin, U.S. 2,770,649, Murphey).

In general the prior art compounds have been found useful for muscle relaxant conditions susceptible to myanesin therapy where the action is central with some slight myoneural depression. The site of the depression appears to be in the brain stem at the level of the thalamus and in the spinal cord. Such action is characterized by producing weakness and flaccidity of the skeletal muscle. The complementary sedative effects of these compounds as well as the muscle relaxant action are temporary in nature, lasting for mephenesin for a period of about an hour after administration.

In contrast to curare, the mephenesin-type compounds have no effect on the muscle end-plates in ordinary dosage and no not paralyze the respiratory muscles or change the blood pressure. This group of compounds has been found to produce reversible paralysis of the skeletal muscles without significantly affecting the heart or autonomic respiration and autonomic functions. Since the mephenesin type compounds antagonize strychnine convulsions, several pharmacological tests developed to date have been based on the degree of antagonism to such convulsions. The duration of action of meprobamate or mepromate is reported to be about three times longer than that of mephenesin. The usefulness of many of these compounds, such as mephenesin, has been lessened due to their relatively brief duration of action, necessitating frequent large doses; and as always workers in the art today are striving for increased activity to lessen dosages and to cut down on any untoward side effects.

Standard pharmacological tests in animals have indicated that the compound 5-o-methoxyphenoxymethyl-2-oxazolidone produced by the novel process of the present invention has utility as a skeletal muscle relaxant with a high degree of activity against strychnine in anti-convulsant behavior.

The patented prior art describing processes for the compound of the present invention can be distinguished. U.S. 2,399,118, 2,437,388, 2,437,390 to Homeyer describe generally the preparation of 2-oxazolidone compounds in which the 5-position is substituted by alkyl or aryl.

However, the preparation of selected 2-oxazolidone ether compounds such as 5-o-methoxyphenoxymethyl-2-oxazolidone has not been described in the prior art to date.

Therefore, it is an object of the present invention to provide an improved method for preparing 5-o-methoxyphenoxymethyl-2-oxazolidone.

It is a further object of the invention to provide a novel method of preparing 5-o-methoxyphenoxymethyl-2-oxazolidone from equimolar quantities of urea and 3-o-methoxyphenoxy-2-hydroxy-1-propyl carbamate.

It is a further object of this invention to provide an improved method of preparing 5-o-methoxyphenoxymethyl-2-oxazolidone as above wherein the urea and the carbamate are rapidly heated to a critical temperature of about 180° C. and preferably in the range 185° C.–200° C.

It is a still further object of the present invention to provide an improved process for preparing 5-o-methoxyphenoxymethyl-2-oxazolidone with improved yields up to 55%–60% of pure compound.

Other objects of this invention will appear from a consideration of the specification and claims.

The following examples illustrate the improved process of the present invention. Comparative Example A exemplifies the preparation of 5-o-methoxyphenoxymethyl-2-oxazolidone from urea and glyceryl guaiacol ether as originally disclosed in my parent application Serial No. 680,647, Lunsford, filed August 28, 1957, and modified by the improved teaching steps of the present process which are applicable to that related urea fusion process as well.

Example 1, exemplary of several runs, teaches the process of the present application and Example 2 illustrates the applicability of the present process to certain other novel 5-aryloxy substituted methyl-2-oxazolidones specifically not claimed in the present application.

*Comparative Example A.—5-ortho-methoxyphenoxymethyl-2-oxazolidone*

A mixture of 39.6 grams (0.2 mol) of glyceryl guaiacol ether and 24.0 grams (0.4 mol) of urea was heated in a flask equipped with a thermometer and ten inch air condenser which was plugged loosely with a wad of cotton. The mixture was heated rapidly to the temperature range of 180° C.–200° C. This was accomplished by placing the reaction flask in a Wood's metal bath which had previously been heated to 190° C., thus accomplishing a rapid heat transfer. Heating in this temperature range was continued for five hours and then the reaction mixture was poured into 200 ml. of water and extracted with chloroform. The chloroform extract was dried over sodium sulfate, filtered and concentrated. The residue was fractionated at reduced pressure and gave a small amount of low boiling material and 30 grams (67.3%) of 5-ortho-methoxyphenoxymethyl-2-oxazolidone; boiling point 220° C.–225° C. at 0.1 mm. The identity of the material was established by mixture melting point determinations with an authentic sample.

Alternatively, the residue from the chloroform extraction was crystallized from 95% ethanol or acetone. This method of workup consistently gave yields in the order of 40% of white product, melting in the range of 140° C.–144° C.

*Example I.—5 - ortho - methoxyphenoxymethyl - 2 - oxazolidone*

A mixture of 24.1 grams (0.10 mol) of 3-ortho-methoxyphenoxy-2-hydroxy-1-propyl carbamate and 6.0 grams (0.10 mol) of urea was heated rapidly to the temperature range of 180° C.–200° C., and maintained there for five hours. The reaction melt was poured into 50% ethyl alcohol, from which the product crystallized as a white solid. The crude yield was 18.3 grams (82%); melting point 131.5° C.–137° C. Crystallization from water and 95% alcohol gave 9.0 grams (40.3%) of pure 5 - ortho - methoxyphenoxymethyl - 2 - oxazolidone; melting point 141° C.–143° C. This melting point was not depressed when the material was mixed with an authentic sample. In additional runs acetone was used instead of ethyl alcohol with equivalent results.

It was found that when the heating time was reduced to three hours and a reaction temperature of 190–200° C. was maintained, equivalent yields (40 to 50%) were obtained, but that the yields were appreciably lowered when the heating time was further reduced to two hours. It was also found that when the temperature was lowered to the range 170–180° the yield was significantly lowered.

When the material was isolated by extraction with chloroform and distillation, as described under Comparative Example A, the yield of pure material was 58.5%.

*Example II.—5 - (3 - chloro - 6 - methylphenoxymethyl)-2-oxazolidone*

A mixture of 12.70 grams (0.05 mol) of 3-(3-chloro-6-methylphenoxy)-2-hydroxy-1-propyl carbamate and 4.4 grams (0.07 mol) of urea was rapidly heated to 195° C.–200° C. and maintained there for five hours. The reaction mixture was poured into ethyl acetate and washed with water. The organic layer was dried over sodium sulfate and concentrated, and the residue which was distilled at 200° C./0.1 mm. of mercury was collected. Yield: 7.0 grams (58%); the compound appeared as a fine white powder and had a melting point of 104° C.–104.5° C. When mixed with an authentic sample the melting point was not depressed.

*Analysis.*—Calcd. for $C_{11}H_{12}ClNO_3$: N, 5.80. Found: N, 5.50.

It is understood that the method of the present invention may be modified without departing from the spirit and scope thereof. The invention is therefore limited only by the scope of the appended claims.

I claim:

1. The method of preparing 5-o-methoxyphenoxymethyl-2-oxazolidone which comprises reacting approximately equimolar quantities of urea and 3 - o - methoxyphenoxy-2-hydroxy-1-propyl carbamate by heating at a temperature of at least 180° C. for a period of at least three hours and separating and recovering said oxazolidone.

2. The method of claim 1 in which the heating is carried out at a temperature range of about 185° C.–200° C.

3. The method of preparing 5-o-methoxyphenoxy-2-oxazolidone which comprises reacting about 1 mol equivalent of urea with about 1 mol equivalent of 3-o-methoxyphenoxy-2-hydroxy-1-propyl carbamate by rapidly heating to a temperature range of about 185° C.–200° C. for a period of about five hours, extracting crude oxazolidone with a suitable solvent, fractionating said extract and recovering said oxazolidone.

4. The method of claim 3 wherein said rapid heating is produced by means of an outside heat transfer medium.

5. The method of claim 3 wherein said suitable solvent is selected from the group consisting of chloroform and ethyl acetate.

6. The method of preparing 5-o-methoxyphenoxymethyl-2-oxazolidone which comprises reacting and heating about 1 mol equivalent of urea with about 1 mol equivalent of 3-o-methoxyphenoxy-2-hydroxy-1-propyl carbamate by rapidly heating to a temperature range of about 185° C.–200° C. for a period of about five hours to produce crude oxazolidone and crystallizing and purifying said crude oxazolidone from an oxygenated solvent.

7. The method of claim 6 wherein said oxygenated solvent is selected from the group consisting of acetone, ethyl alcohol and water.

No references cited.